United States Patent
Nono

(10) Patent No.: US 7,209,632 B2
(45) Date of Patent: Apr. 24, 2007

(54) DIGITAL BROADCAST RECORDING/VIEWING SUPPORT APPARATUS

(75) Inventor: Tomoyuki Nono, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1224 days.

(21) Appl. No.: 10/019,781

(22) PCT Filed: May 1, 2001

(86) PCT No.: PCT/JP01/03765

§ 371 (c)(1),
(2), (4) Date: Jan. 4, 2002

(87) PCT Pub. No.: WO01/86947

PCT Pub. Date: Nov. 15, 2001

(65) Prior Publication Data

US 2003/0098929 A1    May 29, 2003

(30) Foreign Application Priority Data

May 10, 2000 (JP) .............................. 2000-137065

(51) Int. Cl.
- *H04N 7/00* (2006.01)
- *H04N 17/02* (2006.01)
- *H04N 7/10* (2006.01)

(52) U.S. Cl. ...................... 386/46; 348/180; 348/192; 348/193; 725/33

(58) Field of Classification Search ................. 725/39, 725/33; 455/186.1; 386/83, 46; 348/731, 348/180, 192, 193; 709/204
See application file for complete search history.

(56) References Cited

U.S. PATENT DOCUMENTS 4,796,088 A * 1/1989 Nishimura et al. ......... 348/620

(Continued)

FOREIGN PATENT DOCUMENTS

JP            63200689 A * 8/1988

(Continued)

*Primary Examiner*—Thai Q. Tran
*Assistant Examiner*—Daquan Zhao
(74) *Attorney, Agent, or Firm*—Wenderoth, Lind & Ponack, L.L.P.

(57) ABSTRACT

A receive part demodulates and decodes a digital modulated signal obtained by receiving a digital broadcast to generate a transport stream, and extracts data-broadcast data transmitted over a data channel. An electronic program list generator generates, from program sequence information included in the transport stream, display data for a program list. Based thereon, a video display part displays the program list. When the user looks at this and selects a program desired for preset recording through an input operation part, a system control part determines whether or not the weather during the broadcast time period of the program will be bad based on weather forecast information obtained from the data-broadcast data. As a result, if the weather is determined as bad, the system control part causes the video display part to provide a display indicating a possibility of degradation in image quality, etc., during the broadcast time period.

15 Claims, 8 Drawing Sheets

U.S. PATENT DOCUMENTS

| | | | | |
|---|---|---|---|---|
| 5,128,942 A | * | 7/1992 | Kojima | 714/708 |
| 5,508,732 A | * | 4/1996 | Bottomley et al. | 725/93 |
| 6,108,379 A | * | 8/2000 | Shikakura et al. | 375/240 |
| 6,268,849 B1 | * | 7/2001 | Boyer et al. | 725/40 |
| 6,272,433 B2 | * | 8/2001 | Baron et al. | 702/3 |
| 6,543,051 B1 | * | 4/2003 | Manson et al. | 725/33 |
| 6,549,905 B1 | * | 4/2003 | Kim et al. | 707/10 |

FOREIGN PATENT DOCUMENTS

| | | | |
|---|---|---|---|
| JP | 7-184131 | | 7/1995 |
| JP | H07-184131 | * | 7/1995 |
| JP | 11-313260 | * | 4/1998 |
| JP | 62-033044 | * | 8/1998 |
| JP | 11-164278 | | 6/1999 |
| JP | 11-313260 | | 11/1999 |

* cited by examiner

FIG. 6

| PROGRAM LIST | | FRIDAY, AUGUST 18TH, 18:36 | |
|---|---|---|---|
| | ch101 | ch102 | ch103 |
| 18:00 | PROGRAM A | PROGRAM E | PROGRAM I |
| | | PROGRAM F | |
| 19:00 | PROGRAM B | PROGRAM G | |
| 20:00 | | PROGRAM H | PROGRAM J |
| | PROGRAM C | | |
| 21:00 | PROGRAM D | | PROGRAM K |

FIG. 7

PROGRAM LIST     FRIDAY, AUGUST 18TH, 18:36

PRESET FOR RECORDING

AUGUST 20TH ch102
PROGRAM G 19:00~20:00

PRESET ?    YES/NO

!: NO WEATHER INFORMATION AVAILABLE

18:00, 19:00, 20:00, 21:00, PROGRAM D, PROGRAM J, PROGRAM K

US 7,209,632 B2

DIGITAL BROADCAST RECORDING/VIEWING SUPPORT APPARATUS

TECHNICAL FIELD

The present invention relates to a recording/viewing support apparatus that supports recording or viewing of a program that is scheduled to be aired as a digital broadcast using a communication satellite (CS: Communication Satellite), a broadcast satellite (BS: Broadcast Satellite), or a ground wave, and a digital broadcast television receiver having a function of such recording/viewing support apparatus.

BACKGROUND ART

In television receivers, analog broadcasts are gradually degraded in image quality (hereinafter referred to as "receive image quality") as the receive state becomes poorer. On the other hand, degradation in receive image quality of digital broadcasts is not observed even if the receive state becomes poor until it exceeds limitations in an error correcting capability of a television receiver. That is, the receive state and the receive image quality in analog broadcasts, and those in digital broadcasts respectively have a relationship as shown in FIG. 12. From this, it can be said that the receive image quality in digital broadcasts is less prone to be affected by the receive state than that in analog broadcasts. In a case of digital broadcasts, however, the receive quality is rapidly degraded when the receive image state becomes so poor as to exceed the limitations in the error correcting capability of the television receiver. Moreover, when the receive state becomes so poor as to exceed the error correcting capability, digital broadcast television receivers are generally formed so as not to carry out video display.

The receive state in television broadcasting using a satellite or a ground wave is affected by weather. Therefore, when a television program is preset for recording by a VCR, etc., the image quality of recorded video is affected by weather during the broadcast time period of the program. Particularly, in a case where a digital broadcast program is preset for recording, if the receive state will become so poor as to exceed the limitations in the error correction capability of the television receiver due to bad weather during the broadcast time period of the program that is desired for preset recording, it is practically impossible to record the program. Some digital broadcasts require a fee, and therefore the desire can be considered particularly strong to prevent a situation in which recording of the program that is preset for recording is practically impossible due to bad weather.

Furthermore, in a case of drawing up a schedule for viewing a certain program to be aired as a digital broadcast, it will be convenient to know in advance the possibility of degradation in receive image quality due to bad weather during the broadcast time period of the program.

Therefore, an object of the present invention is to provide a digital broadcast recording/viewing support apparatus which is capable of reliably recording or viewing a program that is scheduled to be aired as a digital broadcast.

SUMMARY OF THE INVENTION

To achieve the above object, the present invention has the following aspects.

A first aspect of the present invention is directed to a recording/viewing support apparatus for supporting recording or viewing of a program that is selected by a user as a desired program from among programs scheduled to be aired as digital broadcasts. The recording/viewing support apparatus includes: program specifying information obtaining means for obtaining program specifying information that specifies the desired program based on an operation by the user; weather forecast information obtaining means for obtaining, based on the program specifying information, weather forecast information for a relevant weather at a location where the digital broadcast is received during a broadcast time period of the desired program as relevant weather forecast information; determining means for determining, based on the relevant weather forecast information, whether or not the relevant weather will be so bad as to degrade the desired program in image quality or sound quality; and notifying means for giving, when the determining means determines that the relevant weather will be bad, a notice of a possibility of degradation in image quality or sound quality of the desired program.

According to the above first aspect, based on the weather forecast information for the weather during the broadcast time period of the desired program that is scheduled to be aired as a digital broadcast (relevant weather), it is determined whether or not the relevant weather will be so bad as to degrade the desired program in image quality or sound quality. If the weather is determined as bad, the possibility of degradation in image quality or sound quality of the desired program is reported. Therefore, by selecting a program that may not be degraded in image quality or sound quality due to bad weather during the broadcast time period, the user can reliably record or view the desired program that is scheduled to be aired as a digital broadcast.

In accordance with a second aspect, in the first aspect, the apparatus further includes: searching means for searching, when the determining means determines that the relevant weather will be bad, for a same program to be aired at different time, which is a program that is equal in content to the desired program and is scheduled to be aired in a different time period from the broadcast time period of the desired program; and same program information displaying means for displaying information that specifies the same program to be aired at the different time found by the searching means.

According to the second aspect, if there is a possibility of degradation in image quality or sound quality of the desired program due to bad weather during the broadcast time period, the possibility is reported. Also, a search is made for the same program to be aired at the different time, and information that specifies the found same program to be aired at the different time is displayed. Therefore, if there is a possibility of degradation in image quality or sound quality of the desired program due to bad weather during the broadcast time period, the user can newly select the same program to be aired at the different time as the desired program. Thus, it is possible to reliably and easily record or view the desired program that is scheduled to be aired as a digital broadcast.

In accordance with a third aspect, in the first aspect, the program specifying information obtaining means includes: receiving means for receiving the digital broadcast and generating a transport stream; program information displaying means for displaying a program list based on program sequence information included in the transport stream; and input operation means, operated by the user for selecting the desired program from among programs shown in the program list, for obtaining the program specifying information based on the operation by the user.

According to the third aspect, the user selects the desired program while looking at the program list, and therefore can check the possibility of degradation in image quality or sound quality of the desired program due to bad weather during the broadcast time period. Thus, it is possible to reliably and easily record or view the desired program scheduled to be aired as a digital broadcast.

In accordance with a fourth aspect, in the second aspect, the program specifying information obtaining means includes: receiving means for receiving the digital broadcast and generating a transport stream; program information displaying means for displaying a program list based on program sequence information included in the transport stream; and input operation means, operated by the user for selecting the desired program from among programs shown in the program list, for obtaining the program specifying information based on the operation by the user. IN addition, the searching means searches for the same program to be aired at the different time by using the program sequence information.

According to the fourth aspect, the user selects the desired program while looking at the program list, and therefore can check the possibility of degradation in image quality or sound quality of the desired program due to bad weather during the broadcast time period. Also, if there is the possibility of degradation in image quality or sound quality of the desired program due to bad weather during the broadcast time period, information that specifies the same program to be aired at the different time can be obtained. Thus, it is possible to reliably and easily record or view the desired program that is scheduled to be aired as a digital broadcast.

In accordance with a fifth aspect, in the second aspect, when the searching means finds the same program to be aired at different time, the weather forecast information obtaining means obtains weather forecast information for weather during a broadcast time period of the same program to be aired at different time as new relevant weather forecast information. In addition, when the new relevant weather forecast information is obtained, the determining means determines, based on the new relevant weather forecast information, whether or not the weather during the broadcast time period of the same program to be aired at different time will be so bad as to degrade the desired program in image quality or sound quality. Further, the notifying means gives the notice of the possibility of degradation in image quality or sound quality of the same program to be aired at the different time during the broadcast time period when the weather is determined as bad.

According to the fifth aspect, if there is a possibility of degradation in image quality or sound quality of the desired program due to bad weather during the broadcast time period, the possibility is reported. Also, a search is made for the same program to be aired at the different time, and information that specifies the found same program to be aired at the different time is displayed. If there is also the possibility of degradation in image quality or sound quality of the found same program to be aired at the different time due to bad weather during the broadcast time period, a notice is made as such. Therefore, if there is a possibility of degradation in image quality or sound quality of the desired program due to bad weather during the broadcast time period, the same program to be aired at the different time that may not be degraded in image quality or sound quality due to bad weather can be newly selected. Thus, it is possible to more reliably and easily record or view the desired program that is scheduled to be aired as a digital broadcast.

In accordance with a sixth aspect, in the second aspect, the searching means searches not only digital broadcast programs but also analog broadcast programs for the same program to be aired at different time.

According to the sixth aspect, if there is a possibility of degradation in image quality or sound quality of the desired program due to bad weather during the broadcast time period, a search is made for the same program to be aired at the different time. At this time, not only digital broadcast programs but also analog broadcast programs are searched for finding the same program to be aired at the different time. Therefore, if there is a possibility of degradation in image quality or sound quality of the desired program due to bad weather during the broadcast time period, the user can newly select, as the desired program, even an analog broadcast as the same program to be aired at the different time as an analog broadcast. Thus, it is possible to more reliably and easily record or view the desired program that is scheduled to be aired as a digital broadcast or a program having the same contents.

In accordance with a seventh aspect, in the first or second aspect, the weather forecast information obtaining means includes receiving means for receiving a data broadcast, and obtains the relevant weather forecast information from the data broadcast.

In accordance with an eighth aspect, in the first or second aspect, the weather forecast information obtaining means includes interfacing means for accessing the Internet, and obtains, through the interfacing means, the relevant weather forecast information via the Internet.

In accordance with a ninth aspect, in the first or second aspect, when a probability of precipitation included in the relevant weather forecast information is larger than a predetermined value, the determining means determines that the relevant weather will be so bad as to degrade the desired program in image quality or sound quality.

In accordance with a tenth aspect, in the first or second aspect, when a laundry index included in the relevant weather forecast information is smaller than a predetermined value, the determining means determines that the relevant weather will be so bad as to degrade the desired program in image quality or sound quality.

In accordance with an eleventh aspect, in the first or second aspect, the apparatus further includes storing means for storing correlation data that relates a probability of precipitation to a receive level degradation probability defined as a probability at which a receive level of the digital broadcast becomes smaller than a predetermined level threshold value. In addition, the determining means calculates, based on the correlation data, the receive level degradation probability corresponding to the probability of precipitation included in the relevant weather forecast information and, when the calculated receive level degradation probability is larger than a predetermined probability threshold value, determines that the relevant weather will be so bad as to degrade the desired program in image quality or sound quality.

In accordance with a twelfth aspect, in the first or second aspect, the apparatus further includes storing means for storing correlation data that relates a laundry index to a receive level degradation probability defined as a probability at which a receive level of the digital broadcast becomes smaller than a predetermined level threshold value. In addition, the determining means calculates, based on the correlation data, the receive level degradation probability corresponding to the laundry index included in the relevant weather forecast information and, when the calculated receive level degradation probability is larger than a predetermined probability threshold value, determines that the relevant weather will be so bad as to degrade the desired program in image quality or sound quality.

A thirteenth aspect is directed to a recording/viewing support apparatus for supporting recording or viewing of a program that is selected by a user as a desired program from among programs scheduled to be aired as digital broadcasts. The apparatus includes: program specifying information obtaining means for obtaining program specifying information that specifies the desired program based on an operation by the user; weather forecast information obtaining means for obtaining, based on the program specifying information, weather forecast information for a relevant weather at a location where the digital broadcast is received during a broadcast time period of the desired program as relevant weather forecast information; storing means for storing correlation data that relates the weather forecast information to a receive level degradation probability defined as a probability at which a receive level of the digital broadcast is smaller than a predetermined level threshold value; and notifying means for obtaining the receive level degradation probability corresponding to the relevant weather forecast information, and notifying the user of the obtained receive level degradation probability as information which is indicative of a possibility of degradation in image quality or sound quality of the desired program.

According to the thirteenth aspect, based on the weather forecast information for the weather during the broadcast time period of the desired program that is scheduled to be aired as a digital broadcast, a probability that a receive level of the digital broadcast becomes smaller than a predetermined level threshold value (receive level degradation probability) is reported as information which is indicative of the possibility of degradation in image quality or sound quality of the desired program. Therefore, based on the reported receive level degradation probability, by selecting a program whose broadcast time period does not have such possibility of degradation in image quality or sound quality due to bad weather, the user can reliably record or view the desired program that is scheduled to be aired as a digital broadcast.

In accordance with a fourteenth aspect, in the thirteenth aspect, the correlation data relates the receive level degradation probability to a probability of precipitation or a laundry index included in the relevant weather forecast information.

BRIEF DESCRIPTION OF THE DRAWINGS

FIG. 6 is an illustration showing an example display of an electronic program list in the first embodiment.

FIG. 7 is an illustration showing a first example display of a screen at the time of presetting for recording in the first embodiment.

DETAILED DESCRIPTION OF THE INVENTION

With reference to the attached drawings, embodiments of the present invention are described below. Note that the digital broadcast recording/viewing support apparatuses according to the respective embodiments described below may be realized as an apparatus separately from a television receiver, but can also be realized as a digital broadcast television receiver having a support function as will be described below concerning recording and viewing of a program scheduled to be aired.

First Embodiment

Figure 1:
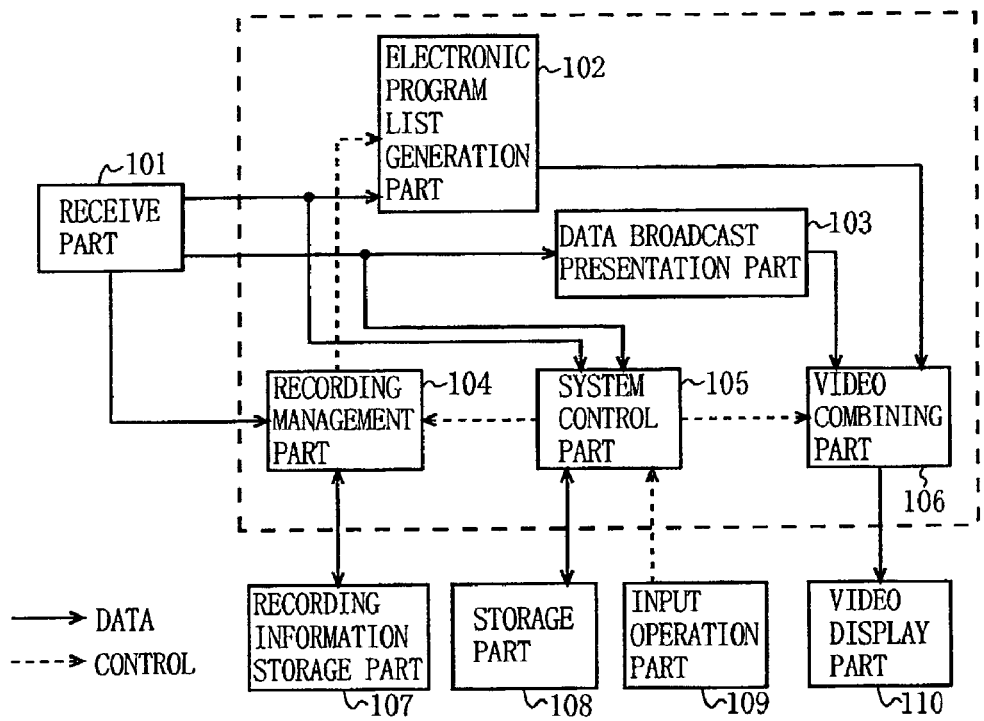
FIG. 1 is a functional block diagram showing the structure of a recording/viewing support apparatus according to a first embodiment of the present invention.

FIG. 1 is a functional block diagram showing the structure of a digital broadcast recording/viewing support apparatus according to a first embodiment of the present invention. This recording/viewing support apparatus is an apparatus for supporting recording and viewing of a program that is scheduled to be aired as a digital broadcast using a satellite or a ground wave. The apparatus includes a receive part 101, an electronic program list generation part 102, a data broadcast presentation part 103, a recording management part 104, a system control part 105, a video combining part 106, a recording information storage part 107, a storage part 108, an input operation part 109, and a video display part 110.

In the above-structured recording/viewing support apparatus, the receive part 101 receives an electric (electronic) wave from a satellite or an electric wave as a ground wave to obtain a digital modulated signal, and demodulates and decodes the digital modulated signal. With this, a transport stream is generated, and program sequence information included in this transport stream is given to the electronic program list generation part 102. Also, when the digital broadcast includes a data broadcast with a data channel, the receive part 101 extracts the data transmitted over the data channel (herein after referred to as "data-broadcast data"), and gives the extracted data to the data broadcast presentation part 103. Furthermore, among the program sequence information and the data-broadcast data, data required for processing which will be described later for supporting recording or viewing is given to the system control part 105.

The electronic program list generation part 102 generates display data for displaying a program list (electronic program list) by using information such as a PAT (Program Association Table), PMT (Program Map Table), etc. (hereinafter referred to as "program list data"), included in the program sequence information given by the receive part 101, and gives the generated program list data to the video combining part 106. On the other hand, the data broadcast presentation part 103 generates display data based on the data-broadcast data given by the receive part 101 (hereinafter referred to as "data broadcast presentation data"), and gives the generated data broadcast presentation data to the video combining part 106.

By using data of the program list, the data broadcast presentation data, and notice data which will be described later, the video combining part 106 generates, under the control of the system control part 105, display data for display to the user, and supplies the generated display data to the video display part 110. The video display part 110 carries out display based on the display data.

The input operation part 109 is used by the user for carrying out an operation such as program selection onto the recording/viewing support apparatus according to the present embodiment. When the user operates the input operation part 109, data indicating the operation is inputted to the system control part 105.

Using the storage part 108 as a working memory, the system control part 105 controls the video combining part 106 and the recording management part 104 by following the operation according to the input operation part 109 by the user. For example, when the user operates the input operation part 109 to select a desired program from the program list or others, the system control part 105 determines, based on the data-broadcast data, the state of broadcasting the program (receive image quality, etc.), and causes the video combining part 106 to generate display data for notifying the user of the determination result as required (hereinafter referred to as "notice data") and combining such generated display data with the other display data.

The recording management part 104 uses data from the receive part 101 to manage, under the control of the system control part 105, recording of programs scheduled to be aired as digital broadcasts, and stores, as recording management information, information for managing a preset recording in the recording information storage part 107. Also, the recording management part 104 controls the electronic program list generation part 102 as required, for displaying the state of presetting for recording, etc.

Figure 2:
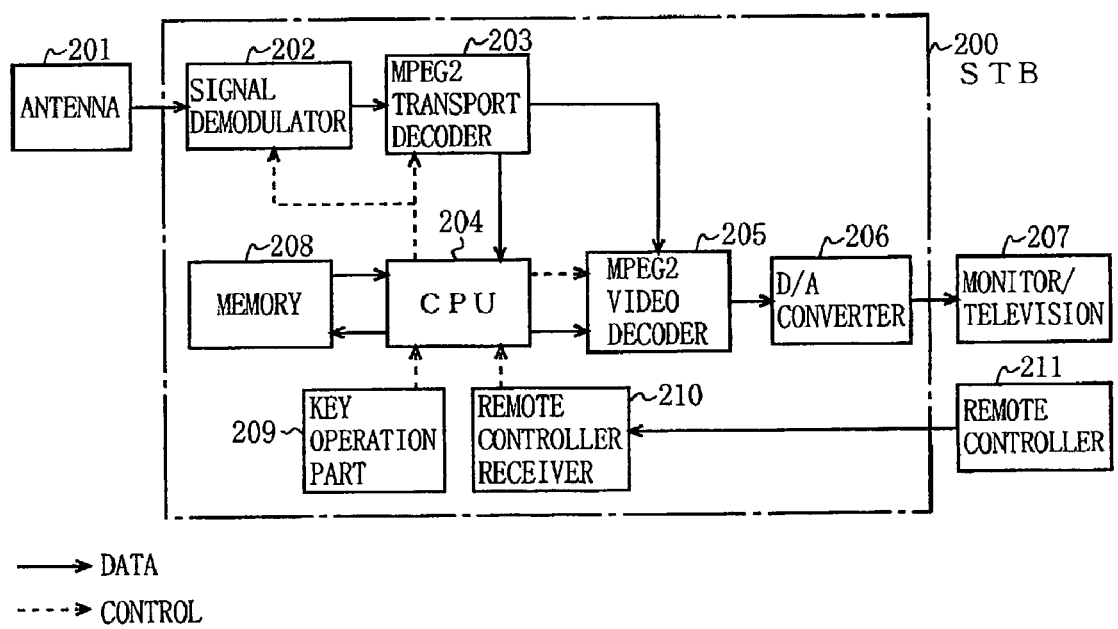
FIG. 2 is a block diagram showing the hardware structure of the recording/viewing support apparatus according to the first embodiment.

FIG. 2 is a block diagram showing the hardware structure of the above recording/viewing support apparatus according to the present embodiment. As shown in FIG. 2, the recording/viewing support apparatus according to the present embodiment includes, in view of the hardware structure, an antenna 201, a set-top box (hereinafter abbreviated as "STB") 200, a monitor/television 207, and a remote controller 211. In addition, the STB 200 is provided with a digital modulated signal obtained by receiving an electric wave from a satellite or an electric wave as a ground wave at the antenna 201. By demodulating and decoding the digital modulated signal, this STB 200 generates and outputs a video signal. This video signal is supplied to a monitor or a conventional television receiver ("monitor/television") 207, where video is displayed.

The above STB 200 has a signal demodulator 202, an MPEG 2 transport decoder 203, a CPU 204, an MPEG 2 video decoder 205, a D/A converter 206, a memory 208, a key operation part 209, and a remote controller receiver 210. In the hardware structure shown in FIG. 2, the receive part 101 of the recording/viewing support apparatus shown in FIG. 1 is realized by the antenna 201, the signal demodulator 202, the MPEG 2 transport decoder 203, and the MPEG 2 video decoder 205. The recording information storage part 107 and the storage part 108 are realized by the memory 208. The input operation part 109 is realized by the key operation part 209, the remote controller 211, and the remote controller receiver 210. The video display part 110 is realized by the monitor/television 207. In addition, the components surrounded by a dotted line in FIG. 1 are realized by software. That is, the electronic program list generation part 102, the data broadcast presentation part 103, the recording management part 104, the system control part 105, and the video combining part 106 are realized by the CPU 204, as a central processing unit, executing a predetermined program stored in the memory 208. Note that the memory 208 includes, in addition to volatile memory used for a working area, nonvolatile memory for storing postal codes, etc., which will be described later.

In the structure shown in FIG. 2, the signal demodulator 202 receives a digital modulated signal from the antenna 201 for demodulation, thereby generating a transport stream. The MPEG 2 transport decoder 203 decodes the transport stream, extracts a compressed image and sound data based on the MPEG 2 standards and the program sequence information, and gives the compressed image and sound data to the MPEG 2 video decoder 205, and the program sequence information to the CPU 204, respectively. Also, when the digital broadcast has a data channel for data broadcast, the MPEG 2 transport decoder 203 extracts data-broadcast data transmitted over the data channel, and gives the extracted data-broadcast data to the CPU 204. Based on an instruction from the user, the CPU 204 uses the program sequence information and the data-broadcast data for generating the program list data and the data broadcast presentation data, respectively, and gives them to the MPEG 2 video decoder 205. Also, the CPU 204 controls the signal demodulator 202, the MPEG 2 transport decoder 203, and the MPEG 2 video decoder 205. The MPEG 2 video decoder 205 decodes the compressed image and sound data, and also uses data obtained by decoding, the program list data, and the data broadcast presentation data to generate the display data indicating an image to be displayed on the screen of the monitor/television 207. This display data is converted into an analog signal by the D/A converter 206, and is then supplied to the monitor/television 207.

Figure 3:
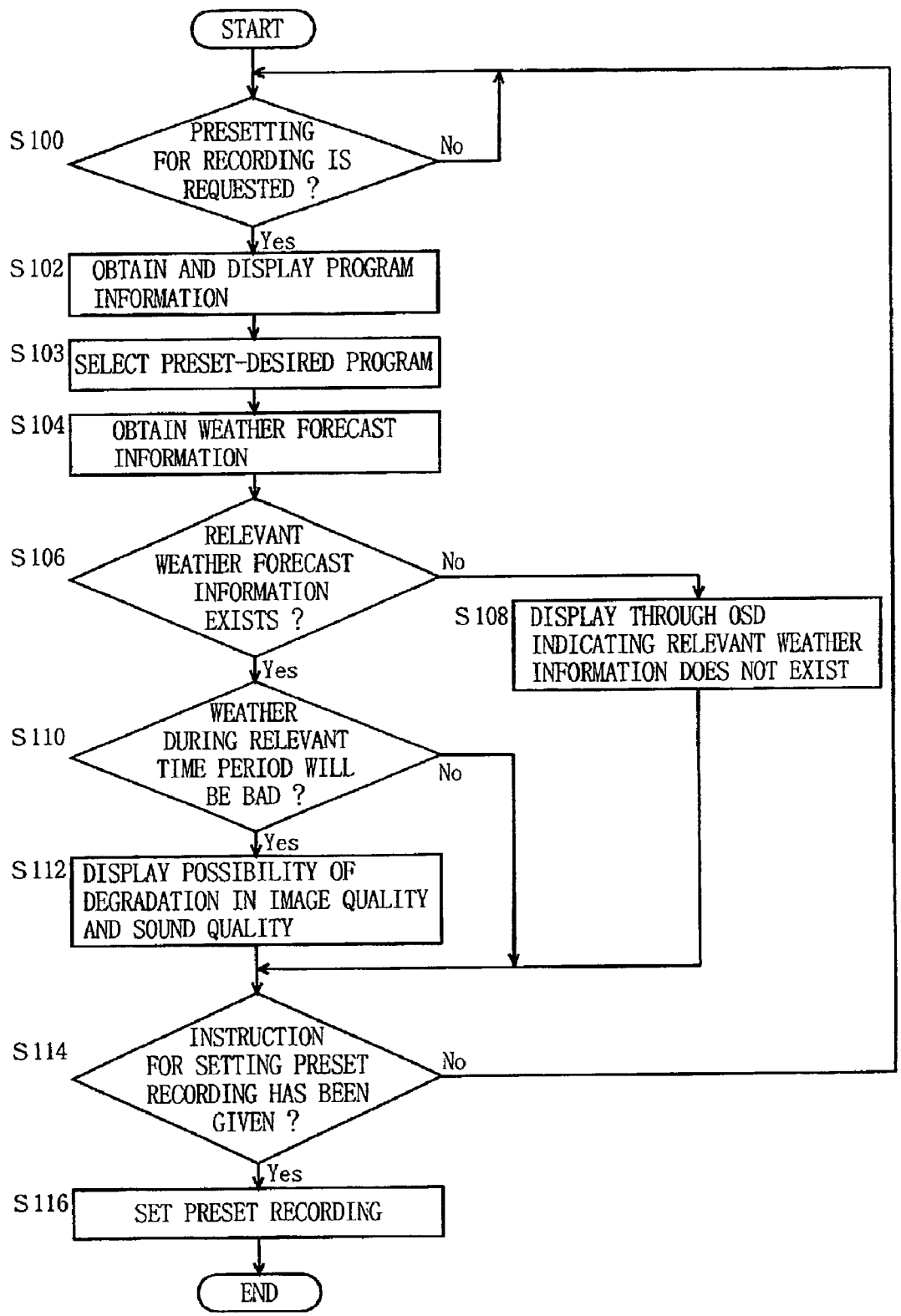
FIG. 3 is a flowchart showing the operation of a CPU in the recording/viewing support apparatus according to the first embodiment.

FIG. 3 is a flowchart showing the operation of the CPU 204 in a case where the recording/viewing support apparatus according to the present embodiment is used for presetting for recording. With reference to this flowchart, the operation of the STB 200 in the present embodiment is described below. Note that, in the following, the operation by the user can be made through either the key operation part 209 or the remote controller 211. The data indicating the operation by the user (hereinafter referred to as "operation data") is sent from the key operation part 209 to the CPU 204, or from the remote controller 211 through the remote controller receiver 210 to the CPU 204.

When the STB 200 is powered ON, the CPU 204 operates as follows.

First, while monitoring the operation data from the key operation part 209 and the remote controller receiver 210, the CPU 204 waits until presetting for recording is requested (step S100).

During the above waiting, when the operation data indicating a request for presetting for recording is inputted, the CPU 204 obtains program specifying information, as preset information, that specifies a program desired by the user for preset recording. That is, first, the program sequence information included in the transport stream obtained from the received digital modulated signal is received from the MPEG 2 transport decoder 203. By using PAT, PMT, etc., in the program sequence information, the program list data is generated, and is sent through the MPEG 2 video decoder 205 and the D/A converter 206 to the monitor/television 207, thereby causing the program list to be displayed on the monitor/television 207 (step S102). FIG. 6 shows an example display of this program list. Looking at such a display of the program list, the user operates the remote controller 211 or the key operation part 209 to select a program that is desired for preset recording (hereinafter referred to as "preset-desired program"). The CPU 204 receives the operation data indicating the selection of the preset-desired program from the remote controller receiver 210 or the key operation part 209, and based on this operation data, obtains information that specifies the preset-desired program from the program sequence information (step S103). Also, display data is outputted for causing the monitor/television 207 to carry out display for inquiring of the user whether or not preset recording of the preset-desired program is to be set.

Next, the CPU 204 receives the data-broadcast data from the MPEG 2 transport decoder 203, and obtains weather forecast information from this data-broadcast data (step S104). Then, it is determined whether or not the obtained weather forecast information includes weather forecast information for the weather during a broadcast time period of the preset-desired program (hereinafter referred to as "relevant weather forecast information) (step S106). This relevant weather forecast information is directed herein to the weather at a location where the user will receive a digital broadcast for preset recording, that is, the weather in an area where the recording/viewing support apparatus is placed. To obtain such relevant weather forecast information, the broadcast time period of the preset-desired program and the area should be specified. This specification of the area can be carried out by providing a postal code. In the present embodiment, the postal code covering the area where the recording/viewing support apparatus according to the present embodiment is placed is stored in advance in the non-volatile memory that constructs part of the memory 208. In the process of obtaining the relevant weather forecast information, the postal code stored in the volatile memory is used.

If it is determined in step S106 that no relevant weather forecast information exists, the CPU 204 outputs predetermined notice data, thereby causing the monitor/television 207 to carry out a display indicating that no relevant weather forecast information exists (step S108). Specifically, such a display is carried out as shown in FIG. 7 through OSD (On Screen Display). After this display, the procedure goes to step S114.

If it is determined in step S106 that the relevant weather forecast information exists, the CPU 204 determines, based on the relevant weather forecast information, whether or not the weather during the broadcast time period of the preset-desired program (hereinafter referred to as "relevant time period") will be bad (step S110). Specifically, a probability of precipitation is extracted from the relevant weather forecast information. If the probability of precipitation during the relevant time period is higher than a predetermined reference value, the weather is determined as bad, and if lower than the reference value, the weather is determined as not bad. Here, selected as the reference value is such a value in which, if the probability of precipitation is higher than the value, the receive state becomes bad due to bad weather with deterioration in image quality or sound quality of the preset-desired program, and thus recording or viewing of the preset-desired program is regarded as practically impossible. Specifically, this reference value can be selected in the following manner.

Figure 11:
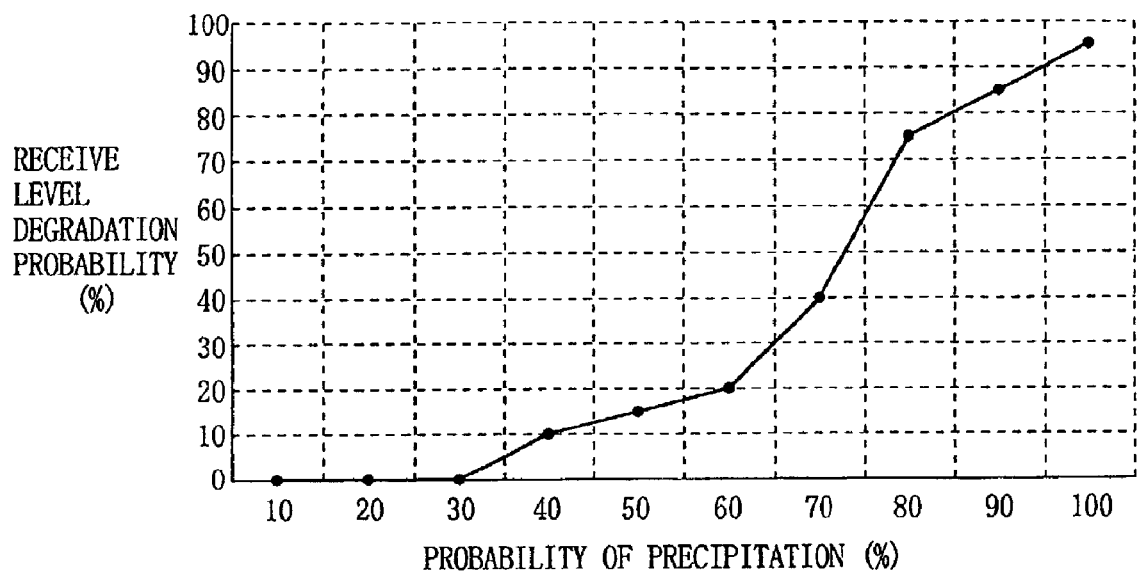
FIG. 11 is a correlation diagram showing a relationship between a probability of precipitation and a receive level degradation probability.
Figure 12:
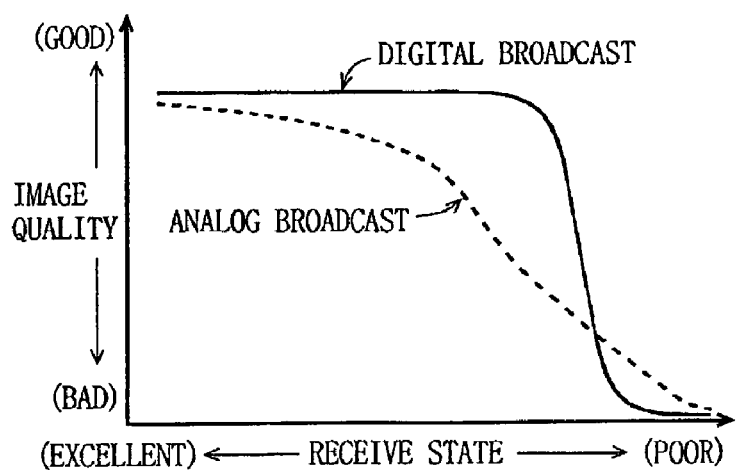
FIG. 12 is a diagram showing the relationship between a receive state and receive image quality in a television receiver for analog broadcasts and digital broadcasts, respectively.

First, based on the relation between the receive state and receive image quality in digital broadcasting, that is, the relationship as illustrated in FIG. 12, a receive level corresponding to the receive state that provides a boundary of whether the user (viewer) can hardly view or can view is selected (hereinafter, this receive level is referred to as "receive threshold value"). For example, a value of a receive level corresponding to the limitation of the error correction capability of the digital broadcast television receiver may be selected as the receive threshold value. Next, data is collected, where such data is composed of sample values of the probability of precipitation at N points in time during a previous predetermined period and sample values of the receive level at the N points in time. From this data (hereinafter referred to as "collected data"), a probability is calculated at which the receive level becomes lower than the receive threshold value, that is, the receive level becomes degraded to such a degree that the user can hardly view a desired program (hereinafter referred to as "receive level degradation probability"), and a correlation diagram is generated, representing a relationship between the probability of precipitation and the receive level degradation probability. FIG. 11 shows one example of such a correlation diagram. In FIG. 11, for example, when the probability of precipitation is 50%, the receive level degradation probability is 15%. This indicates that, assuming that, among the above N samples, M is the number of samples whose probability of precipitation is within a range of 50±5%, (0.15×M) samples of the M samples are smaller in receive level than the receive threshold value. That is, according to FIG. 11, it is regarded that, when the probability of precipitation is 50%, the probability of degradation in receive level is 15%, which is such a level where the viewer can hardly view the desired program. Next, under the premise shown in such correlation diagram, a receive level degradation probability threshold value is set so as to have a minimum value of the receive level degradation probability, that is, the threshold value at which it can be regarded that the receive level is so degraded that the viewer can hardly view the desired program. Then, with the above correlation diagram, the probability of precipitation corresponding to the receive level degradation probability threshold value is taken as a reference value for decision in step S110. For example, when the receive level degradation probability threshold value is set as 40%, according to FIG. 11, the probability of precipitation, which is a reference value for the above decision, is 70%. In this case, when the probability of precipitation at a certain point in time is higher than 70%, it is determined that, at that point in time, the receive level is degraded due to bad weather to a level at which the viewer can hardly view, that is, the receive image quality and others are degraded due to bad weather and recording and viewing becomes practically impossible.

The relation between the probability of precipitation and the receive level degradation probability is changed depending on weather. Thus, even with the same receive level degradation probability threshold value being set, the value of the probability of precipitation as the reference value for the above decision varies depending on the area (for example, whether mountainous area or plain area). Therefore, the reference value for the above decision is preferably selected depending on in which area the recording/viewing support apparatus according to the present invention is placed. That is, the reference value is preferably selected based on the above correlation diagram that is generated from the collection data for the area. In this case, assume that the reference values for the above decision corresponding to respective areas are aired with postal codes indicating the respective areas through data broadcasting. In this case, the reference value for the above decision for the area indicated by the postal code stored in the memory 208 is extracted from the data-broadcast data, thereby enabling selection of the reference value for the above decision corresponding to the area where the recording/viewing support apparatus is placed. Note herein that the reference value for the above decision is selected by taking into consideration the fact that the correlation diagram representing the relation between the probability of precipitation and the receive level degradation probability depends on the area. Similarly, it is also preferable that the reference value for the above decision be selected in consideration of the dependence of the correlation diagram on the season. That is, for every season that is significantly changed in weather state, the reference value for the above decision is preferably selected based on the above correlation diagram for that season.

Figure 8:
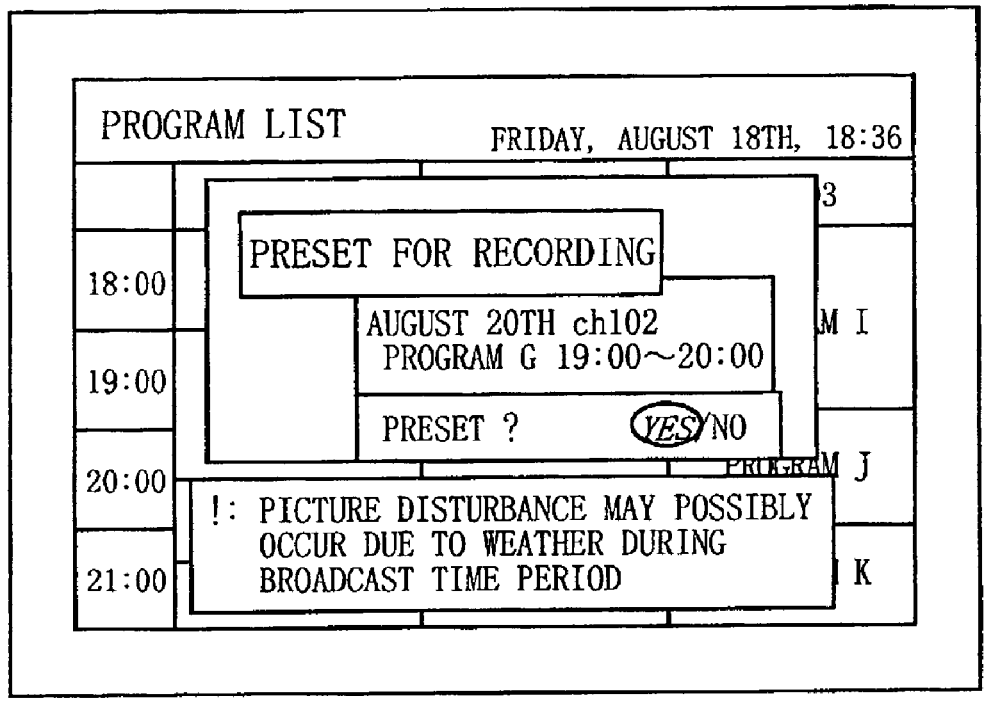
FIG. 8 is an illustration showing a second example display of the screen at the time of presetting for recording in the first embodiment.

Based on the reference value selected in advance in the above described manner, if it is determined in step S110 that the weather during the time period will be bad, the CPU 204 causes the predetermined notice data to be outputted, thereby causing the monitor/television 207 to carry out a display indicating that the image quality or the sound quality may possibly be degraded during the relevant time period (step S112). Specifically, such a display is made as shown in FIG. 8 through OSD. After this display, the procedure goes to step S114. On the other hand, if it is determined in step S110 that the weather during the relevant time period will not be bad, no display indicating the possibility of degradation in image quality or sound quality is carried out, and the procedure goes to step S114.

At the time when the procedure goes to step S114, the monitor/television 207 has a display on its screen for inquiring of the user as to whether or not preset recording of the preset-desired program should be set. Also, in some cases, together with this display, a display is carried out indicating that no relevant weather forecast information exists or indicating the possibility of degradation in image quality or sound quality (refer to FIG. 7 and FIG. 8). Looking at such a display, the user decides whether or not to set preset recording of the preset-desired program, and carries out an operation based on the decision through the remote controller 211 or the key operation part 209.

The CPU 204 receives operation data which is indicative of the above operation, and determines whether or not an instruction for setting preset recording has been given (step S114). Here, if it is determined that the instruction for setting preset recording has been given (as shown in FIG. 7 and FIG. 8, if "YES" is selected), information about presetting for recording, that is, information that is required for recording the preset-desired program (recording management information) is stored in the memory 208 (step S116). When preset recording is set as such, the CPU 204 then uses the recording management information stored in the memory 208 to control the STB 200 and a VCR (not shown) so that they receive the aired program for recording during the broadcast time of the preset-desired program.

If it is determined in step S114 that an instruction for setting preset recording has not been given, a display is carried out, for example, indicating the possibility of degradation in image quality or sound quality due to bad weather during the relevant time period. If the user carries out an operation for giving an instruction for not setting preset recording (in the display of FIG. 8, if "NO" is selected), the procedure returns to step S100, and enters a state of waiting for a request for preset recording from the user.

According to the above described present embodiment, when the user looking at a program display selects a program desired for preset recording, that is, a preset-desired program, if there is a possibility of degradation in image quality or sound quality due to bad weather during the broadcast time of the preset-desired program, an indication as such is displayed on the monitor/television 207 (assume herein that the relevant weather forecast information exists). In this case, the user can decide that recording of the preset-desired program will be practically impossible due to bad weather, and can give an instruction for not setting preset recording. Moreover, in this case, the user can again request for preset recording, and cause the program list to be displayed for selecting the program of the other time period as the preset-desired program. As such, the user can recognize the possibility of degradation in image quality and sound quality due to bad weather during the broadcast time period of the selected preset-desired program. Thus, by selecting the program during another broadcast time period without the possibility of degradation in image quality and sound quality due to such bad weather, it is possible to reliably record the program that is aired as a digital broadcast.

Second Embodiment

A digital broadcast recording/viewing support apparatus according to a second embodiment of the present invention will now be described. A functional block diagram of this recording/viewing support apparatus is similar to that in the first embodiment, as shown in FIG. 1. Also, a block diagram showing the hardware structure of this recording/viewing support apparatus is similar to that in the first embodiment, as shown in FIG. 2. However, in the present embodiment, a program which is partially different from that in the first embodiment is stored in the memory 208. By executing the program at the CPU 204, a function which is different from that in the first embodiment is also realized.

Figure 4:
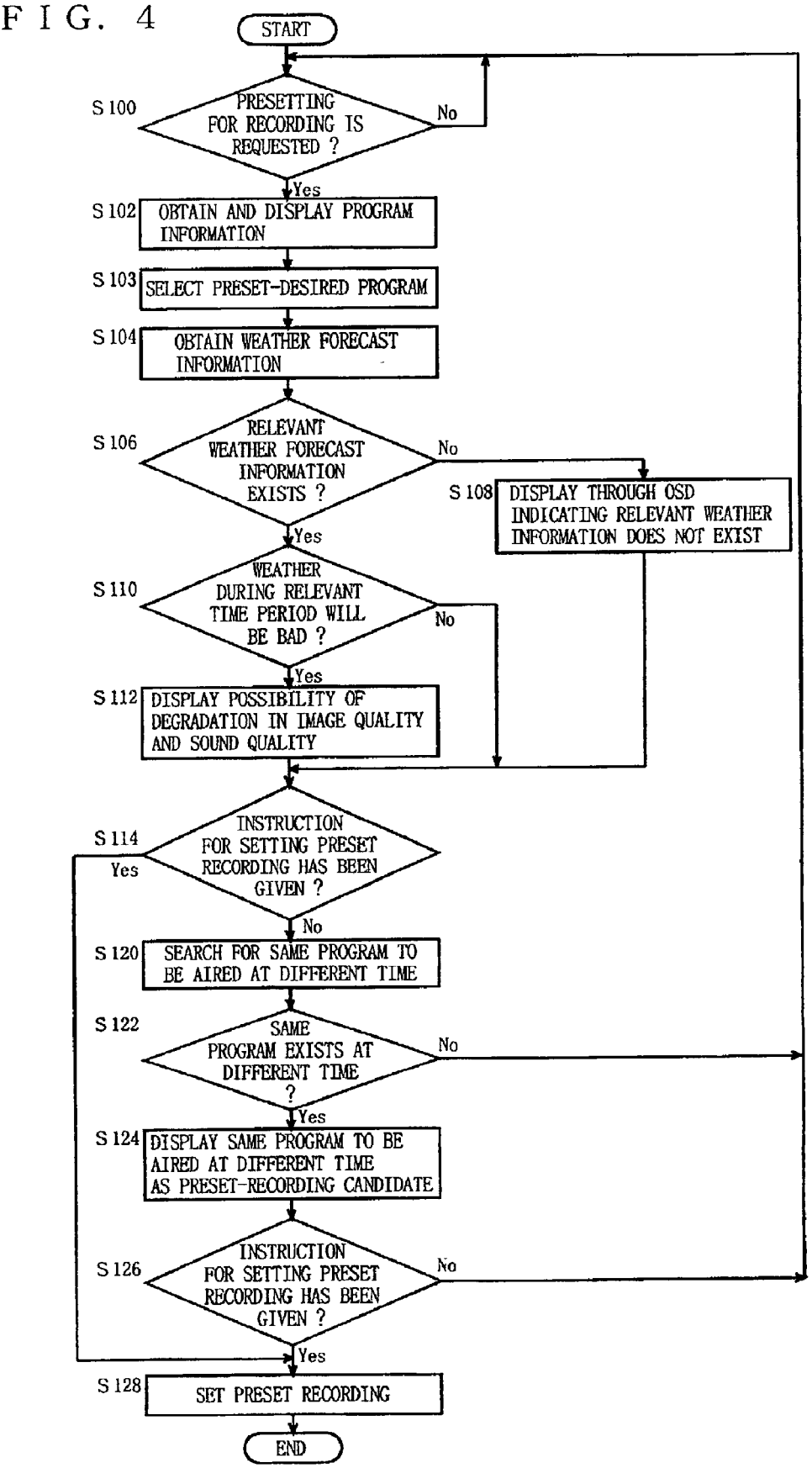
FIG. 4 is a flowchart showing the operation of a CPU in a recording/viewing support apparatus according to a second embodiment of the present invention.

FIG. 4 is a flowchart showing the operation of the CPU 204 in a case where preset for recording is carried out by using the recording/viewing support apparatus according to the present embodiment. With reference to this flowchart, the operation of the STB 200 in the present embodiment is described below. Note that, in this flowchart, steps S100 to S114 are the same as those in the flowchart shown in FIG. 3. In both of the flowcharts, the same steps are provided with the same reference numeral. The processing in and after step S114 in the present embodiment is described mainly below.

At the time when the procedure goes to step S114, the monitor/television 207 has a display on its screen for inquiring of the user as to whether or not a preset recording of the preset-desired program should be set. Also, in some cases, together with this display, a display is carried out indicating that no relevant weather forecast information exists or indicating the possibility of degradation in image quality or sound quality (refer to FIG. 7 and FIG. 8). Looking at such a display, the user decides whether or not to set preset recording of the preset-desired program, and carries out an operation based on the decision through the remote controller 211 or the key operation part 209.

As with the first embodiment, if it is determined in step S114 that the instruction for setting preset recording has been given, information which is required for recording the preset-desired program (recording management information) is stored in the memory 208 (step S128). When preset recording is set as such, the CPU 204 then uses the recording management information stored in the memory 208 to control the STB 200 and the VCR (not shown) so that they receive the aired program for recording during the broadcast time of the preset-desired program.

On the other hand, unlike the first embodiment, if it is determined in step S114 that the instruction for setting preset recording has not been given (an instruction for not setting preset recording has been given), a search is made, by using the program sequence information given by the MPEG 2 transport decoder 203, for a program that has the same content as the preset-desired program selected by the user and is scheduled to be aired at a different time (hereinafter referred to as "same program to be aired at a different time) (step S120). As a result of this search, if the same program to be aired at a different time cannot be found, the procedure returns to step S100 (step S122), and enters a state of waiting for a request for preset recording from the user.

Figure 9:
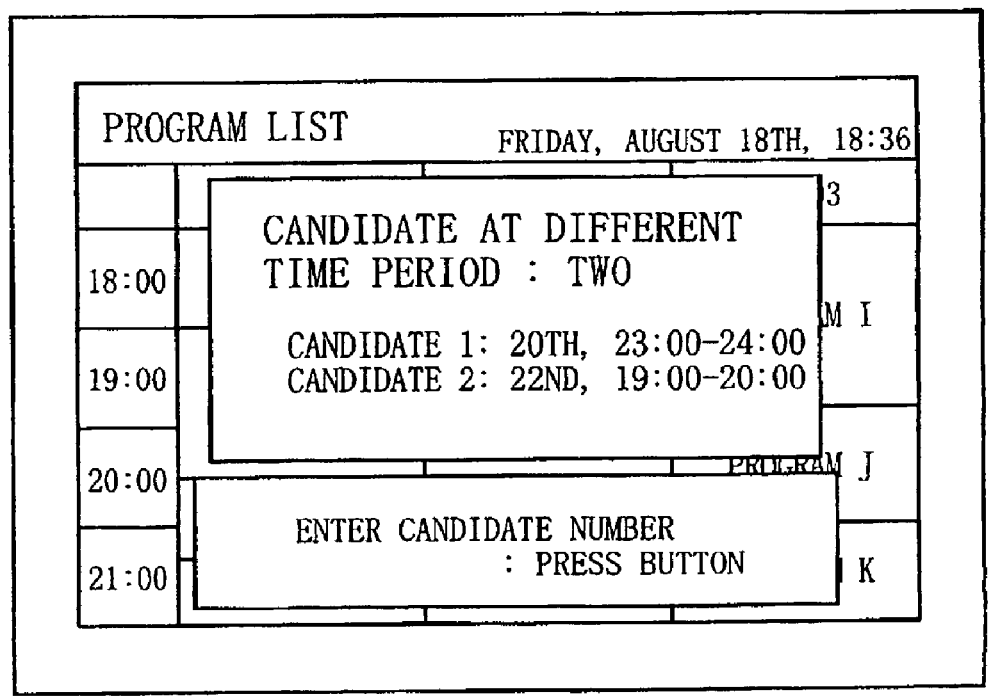
FIG. 9 is an illustration showing an example display of a screen at the time of presetting for recording in the second embodiment.

As a result of the search in step S120, if the same program to be aired at a different time is found, the same program to be aired at a different time is regarded as a candidate for the program for preset recording (hereinafter referred to as "preset-recording candidate"), and information that specifies the preset-recording candidate (for example, broadcast date/time and broadcasting channel of the preset-recording candidate, etc.) is displayed on the monitor/television 207 (step S124). FIG. 9 shows an example display of the information specifying the preset-recording candidate. In this example, two of the same programs to be aired at different times have been found. Therefore, as the information that specifies the preset-recording candidates, broadcast dates and broadcasting time periods of two candidates ("candidate 1" and "candidate 2") are displayed. Also, in step S124, a display is carried out for inquiring of the user as to whether or not a preset recording of the preset-recording candidate program should be set. In the example shown in FIG. 9, a display is carried out for prompting the user to give an input for selecting either one of the two preset-recording candidates, the candidate 1 and the candidate 2. When either one of the preset-recording candidates is selected with an operation by the user, it is regarded that a preset recording is set for the selected preset-recording candidate as the preset-desired program.

Next, the CPU 204 receives the operation data which is indicative of the above operation to determine whether or not an instruction for setting preset recording has been given (step S126) Here, if it is determined that the instruction for preset recording has been given, information which is required for recording the preset-desired program, which is the selected preset-recording candidate, is stored as the recording management information in the memory 208 (step S128). After a preset recording has been set in the above manner, the CPU 204 uses the recording management information to control the STB 200 and the VCR (not shown) so that they receive, during the broadcast time of the preset-desired program, which is the selected preset-recording candidate, the aired program for recording.

On the other hand, if it is determined in step S126 that the instruction for setting a preset recording has not been given (an instruction for not setting preset recording has been given), the procedure returns to step S100, and enters a state of waiting for a request for preset recording from the user.

According to the above described present embodiment, as with the first embodiment, if there is a possibility of degradation in image quality or sound quality due to bad weather during the broadcast time of the preset-desired program that is selected by the user, an indication as such is displayed on the monitor/television 207. In addition, in the present embodiment, when an instruction for not setting a preset recording is given by the user in this case, a search is made for the same program to be aired at a different time. If the same program to be aired at a different time is found, a preset recording of the same program to be aired at a different time is set based on an operation by the user. As such, according to the present embodiment, if there is the possibility of degradation in image quality or sound quality due to bad weather during the broadcast time of the preset-desired program, the same program to be aired at a different time is preset for recording. Thus, the program that is scheduled to be aired as a digital broadcast can be reliably and easily recorded.

Third Embodiment

A digital broadcast recording/viewing support apparatus according to the third embodiment of the present invention will now be described. A functional block diagram and a block diagram showing the hardware structure of this recording/viewing support apparatus are similar to those in the first embodiment (refer to FIG. 1 and FIG. 2). However, in the present embodiment, a program which is partially different from that in the second embodiment is stored in the memory 208. By executing the program at the CPU 204, a function which is different from that in the second embodiment is also realized.

Figure 5:
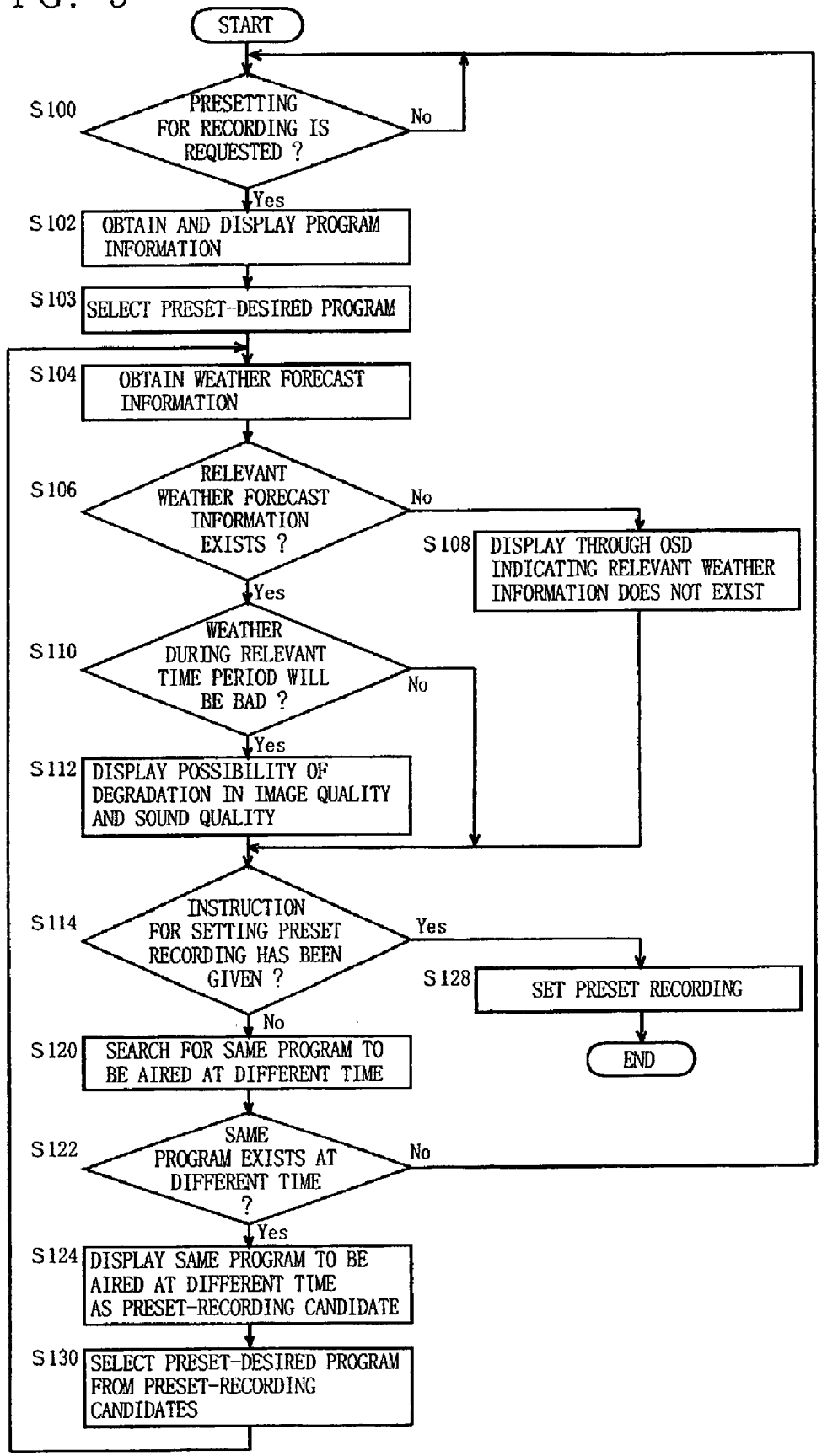
FIG. 5 is a flowchart showing the operation of a CPU of a recording/viewing support apparatus according to a third embodiment of the present invention.

FIG. 5 is a flowchart showing the operation of the CPU 204 in a case where a preset recording is carried out by using the recording/viewing support apparatus according to the present embodiment. With reference to this flowchart, the operation of the STB 200 in the present embodiment is described below. Note that, of the steps in this flowchart, the same step as that in the flowchart shown in FIG. 4 is provided with the same reference numeral.

In the present embodiment, as with the second embodiment, when preset recording is requested through a predetermined operation by the user (step S100), steps S102 to S114 are executed.

At the time when the procedure goes to step S114, the monitor/television 207 has a display on its screen for inquiring of the user as to whether or not a preset recording of the preset-desired program should be set. Also, in some cases, together with this display, a display is carried out indicating that no relevant weather forecast information exists or indicating the possibility of degradation in image quality or sound quality (refer to FIG. 7 and FIG. 8). Looking at such a display, the user decides whether or not to set a preset recording of the preset-desired program, and carries out an operation based on the decision through the remote controller 211 or the key operation part 209. In step S114, the CPU 204 receives operation data indicating this operation to determine whether or not an instruction for setting preset recording has been given. As a result, if it is determined that the instruction for setting a preset recording has been given, as with the second embodiment, information which is required for recording the preset-desired program (recording management information) is stored in the memory 208 (step S128). Thus, a preset recording is set.

On the other hand, if it is determined in step S114 that the instruction for setting a preset recording has not been given (an instruction for not setting a preset recording has been given), as with second embodiment, a search is made for the same program to be aired at a different time (step S120). As a result, if the same program to be aired at a different time has not been found, the procedure returns to step S100 (step S122). On the other hand, if the same program to be aired at a different time has been found, the same program to be aired at a different time is regarded as the preset recording candidate. As shown in FIG. 9, for example, information that specifies the preset recording candidate is displayed (step S124).

When the user looking at the display made in step S124 carries out an operation for selecting the preset recording candidate, the CPU 204 receives operation data corresponding thereto and, based on the operation data, regards the selected preset recording candidate as the preset-desired program (step S130).

When new preset-desired program is selected from among the preset recording candidates in the above manner, the procedure returns to step S104. Thereafter, for the new preset-desired program, steps S104 to S114 are executed. Then, at the time when the procedure goes to step S114, the monitor/television 207 has a display on its screen for inquiring of the user as to whether or not the preset-desired program is preset for recording. Also, in some cases, together with this display, a display as shown in FIG. 7 or FIG. 8 is carried out. For example, if the relevant weather forecast information for the weather during the broadcast time period of the new preset-desired program has been obtained and it is determined that the weather during the broadcast time period is worse than a predetermined criterion, a display is carried out indicating the possibility of degradation in image quality or sound quality during the broadcast time period, as shown in FIG. 8. Looking at such a display, the user decides whether or not to set preset recording of the new preset-desired program, and carries out an operation based on the decision through the remote controller 211 or the key operation part 209. In step S114, the CPU 204 receives operation data indicating this operation to determine whether or not an instruction for setting preset recording has been given.

As a result, if it is determined that the instruction for setting a preset recording has been given, as with the above, information which is required for recording the preset-desired program (recording management information) is stored in the memory 208 (step S128), which is similar to the above. Thus, a preset recording is set.

If it is determined in step S114 that the instruction for setting a preset recording has not been given (an instruction for not setting a preset recording has been given), a search is made for the same program to be aired at a different time that has not yet been selected as the preset-desired program (step S120). As a result, if the same program to be aired at a different time that has not yet been selected as the preset-desired program has been found, the procedure goes to step S124 (step S122). Thereafter, as long as the instruction for setting a preset recording of the preset-desired program is not given and any same program to be aired at a different time that has not yet been selected as the preset-desired program exists, steps S124, S130, S104 to S122 are repeatedly executed. Then, if there becomes no same program to be aired at a different time that has not yet been selected as the preset-desired program during the processing, the procedure returns to step S100, and enters a state of waiting for a request for preset recording from the user. On the other hand, if the instruction for setting a preset recording of the preset-desired program is given during the processing, information which is required for recording the preset-desired program (recording management information) is stored in the memory 208, which is similar to the above (step S128).

According to the above described present embodiment, as with the second embodiment, in a case where there is a possibility of degradation in image quality or sound quality due to bad weather during the broadcast time of the preset-desired program that is selected by the user, when an instruction for not setting a preset recording is given by the user, a search is made for the same program to be aired at a different time. If the same program to be aired at a different time is found, a preset recording of the same program to be aired at different time is set based on an operation by the user. The same program to be aired at a different time that is selected on this occasion is regarded as a new preset-desired program. The relevant weather forecast information for the new preset-desired program is obtained. Based on the relevant weather forecast information, if there is the possibility of degradation in image quality or sound quality due to bad weather during the broadcast time of the new preset-desired program, an indication as such is displayed. As such, according to the present embodiment, if there is the possibility of degradation in image quality or sound quality due to bad weather during the broadcast time of the preset-desired program, a search is made for the same program to be aired at a different time. If there is also the possibility of degradation in image quality or sound quality due to bad weather during the broadcast time of the found same program to be aired at different time, an indication as such is displayed. Thus, since the user takes this display into consideration when giving the instruction for setting a preset recording, the program that is scheduled to be aired as a digital broadcast can be more reliably recorded.

Note that, in the above embodiment, if a plurality of the same programs to be aired at a different time have been found, the relevant weather forecast information is obtained only for the program that is selected by the user among the plurality of same programs to be aired at a different time, that is, a new preset-desired program. Alternatively, the relevant weather forecast information may be obtained for all of the found same programs to be aired at a different time. Based on the relevant weather forecast information for those programs, all of the same programs to be aired at a different time having the possibility of degradation in image quality or sound quality due to bad weather may have a display indicating as such.

Modification Example

In the above, a case is described where a preset recording is set for a program that the user desires to view. However, the recording/viewing support apparatus of each of the above embodiments is also effective for a case where the user does not particularly desire to record but desires to view a certain program that is scheduled to be aired as a digital broadcast. That is, the recording/viewing support apparatus of each of the above embodiments is also effective for a case of checking to see whether the program can be viewed in a condition that is good in image quality or sound quality, or whether the program may possibly be hardly viewable in practical terms due to bad weather, and also for a case of checking to see, in a case where the program has the same programs to be aired at a different time, during which time period the program can be viewed in a condition that is good in image quality and sound quality.

In each of the above embodiments, for determining whether or not there is a possibility of degradation in image quality or sound quality to such a degree that the preset-desired program cannot be practically received, the probability of precipitation included in the relevant weather forecast information is compared with the reference value selected in advance, thereby determining whether or not the weather during the broadcast time period of the preset-desired program will be bad (step S110). Instead of comparing the probability of precipitation included in the relevant weather forecast information with the reference value selected in advance, the receive level degradation probability corresponding to the probability of precipitation may be compared with the received level degradation probability threshold value selected in advance, thereby determining whether or not the weather during the broadcast time period of the preset-desired program will be bad. In this case, correlation data indicating the relation between the probability of precipitation and the receive level degradation probability is generated in a manner similar to that for use in generating the correlation diagram shown in FIG. 11, and is stored in advance in the memory 208. In step S110 (refer to FIG. 3, FIG. 4, and FIG. 5), based on the receive level degradation probability related by the correlation data to the probability of precipitation included in the relevant weather forecast information, whether or not the weather will be bad is determined. That is, based on the correlation data stored in the memory 208, the receive level degradation probability corresponding to the probability of precipitation included in the relevant weather forecast information (hereinafter referred to as "relevant receive level degradation probability") is obtained. The relevant receive level degradation probability is compared with the receive level degradation probability threshold value (step S110). If the relevant receive level degradation probability is higher than the receive level degradation probability threshold value, the weather is determined as bad, and a display is made indicating the possibility of degradation in image quality or sound quality during the broadcast time period of the preset-desired program (step S112). For example, in a case where the correlation data as shown in FIG. 11 is used, and the receive level degradation probability threshold value is set as 40%, if the probability of precipitation included in the relevant weather forecast information is 60%, the relevant receive level degradation probability is 20% (<40%). Therefore, the weather is determined as not bad. If the probability of precipitation included in the relevant weather forecast information is 80%, the relevant receive level degradation probability is 75% (>40%). Therefore, the weather is determined as bad, and a display is carried out indicating the possibility of degradation in image quality or sound quality.

Also, as described above, in a case where the correlation data indicating the relationship between the probability of precipitation and the receive level degradation probability is held in the memory 208, step S110 may be deleted and, in step S112, the relevant receive level degradation probability based on the correlation data may be displayed as information indicating the possibility of degradation in image quality or sound quality of the preset-desired program. In this case, for example, in a case where the correlation data as shown in FIG. 11 is used, and if the probability of precipitation included in the relevant weather forecast information is 70%, the relevant receive level degradation probability is 40%. Therefore, in step S112, a message such as "The probability of degradation in image due to the weather of the broadcast time period is 40%", for example, is displayed through OSD.

The relationship between the probability of precipitation and the receive level degradation probability is changed depending on the weather. Therefore, the correlation data to be stored in the memory 208 is preferably varied depending on the area (whether mountainous area or plain area, for example). That is, the correlation data indicating the relation between the probability of precipitation and the receive level degradation probability is generated for each area. Among a plurality of pieces of correlation data, the correlation data for the area where the recording/viewing support apparatus according to the present embodiment is placed is preferably selected, and is stored in the memory 208. Note herein that the dependence of the correlation data indicating the relation between the probability of precipitation and the receive level degradation probability on the area is taken into consideration. It is also preferable that the dependence of the correlation data on the season be taken into consideration. That is, for every season that is significantly changed in the state of weather, the above correlation data therefor is preferably stored in the memory 208. Also, in the above, a description has been provided assuming that the correlation data is stored in advance in the memory 208. Alternatively, for example, the correlation data may be aired through data broadcasting from a broadcast station, and may be extracted from data-broadcast data received at the recording/viewing support apparatus for storage in the memory 208. In this case, assuming that the correlation data for respective areas is broadcast through data broadcasting and the respective areas are specified by their postal codes, the correlation data for the area indicated by the postal code stored in the memory 208 is extracted from the data-broadcast data, thereby enabling the correlation data for the area where the recording/viewing support apparatus is placed to be stored in the memory 208.

In each of the above embodiments, whether or not the weather during the broadcast time period of the preset-desired program will be bad is determined based on the probability of precipitation included in the relevant weather forecast information (refer to step S110 of FIG. 3, FIG. 4, and FIG. 5). Alternatively, whether the weather or not will be bad may be determined based on any other index included in the relevant weather forecast information. For example, a laundry index which is included in the relevant weather forecast information may be compared with a predetermined reference value. If the laundry index is lower than the reference value, the weather is determined as bad, and a display is carried out indicating the possibility of degradation in image quality or sound quality during the broadcast time period of the preset-desired program. Also, instead of the above correlation data indicating the relation between the probability of precipitation and the receive level degradation probability, correlation data indicating the laundry index and the receive level degradation probability may be stored in the memory 208 and, based on the receive level degradation probability related by the correlation data to the laundry index included in the relevant weather forecast information, whether or not the weather will be bad may be determined. That is, based on the correlation data indicating the laundry index and the receive level degradation probability, the receive level degradation probability corresponding to the laundry index included in the relevant weather forecast information, that is, the relevant receive level degradation probability, is obtained. The relevant receive level degradation probability is compared with a predetermined receive level degradation probability threshold value. If the relevant receive level degradation probability is higher than the receive level degradation probability threshold value, the weather is determined as bad, and a display is carried out indicating the possibility of degradation in image quality or sound quality during the broadcast time period of the preset-desired program.

Figure 10:
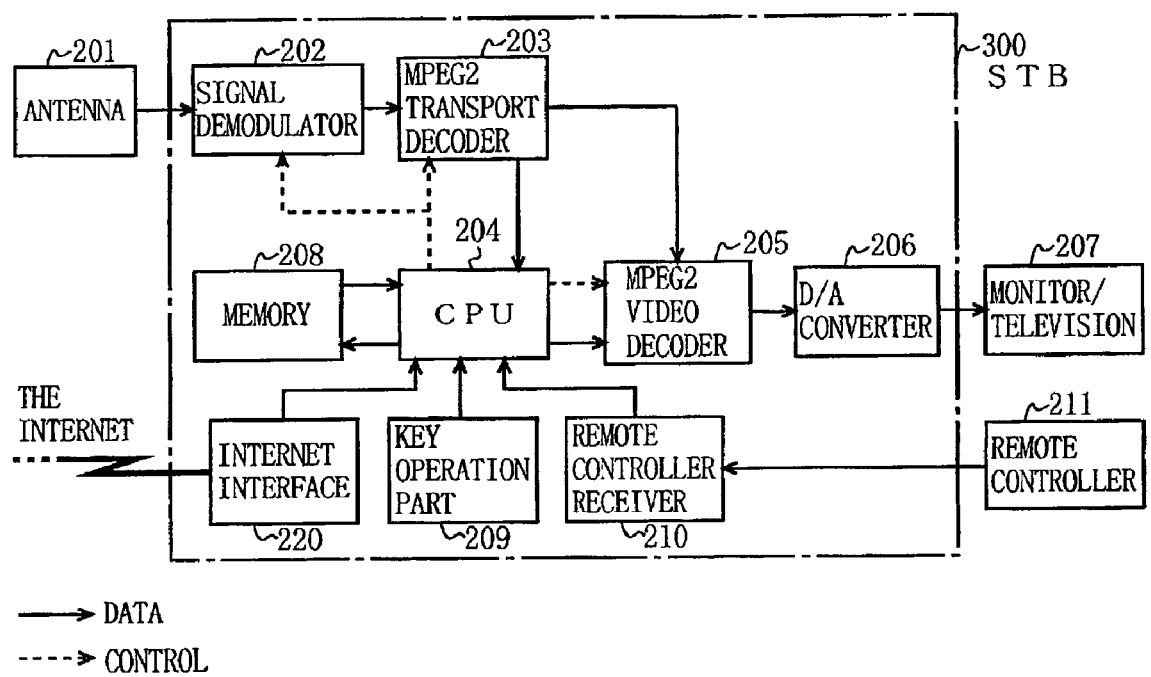
FIG. 10 is a block diagram showing the hardware structure of a modification example of the recording/viewing support apparatus according to the first embodiment.

Further, in each of the above embodiments, for determining whether or not the weather during the broadcast time period of the preset-desired program will be bad to such a degree as to degrade the image quality or the second quality of the preset-desired program, the weather forecast information is obtained from the data-broadcast data (step S104 of FIG. 3, FIG. 4, and FIG. 5). Alternatively, the weather forecast information may be obtained through other means. For example, as shown in FIG. 10, if the STB 300 of the recording/viewing support apparatus includes an Internet interface part 220 for accessing the Internet, the weather forecast information may be obtained via the Internet. Based on an appropriate index, such as the probability of precipitation included in the weather forecast information, whether or not the weather during the broadcast time period of the preset-desired program will be bad is determined.

Still further, in the above second and third embodiments, in a case where there is the possibility of degradation in image quality or sound quality due to bad weather during the broadcast time period of the preset-desired program, when an instruction for not setting a preset recording is given by the user, a search is made for the same program to be aired at a different time (refer to step S120 of FIG. 4 and FIG. 5). At this time, the range to be searched may not be limited to programs that are scheduled to be aired as digital broadcasts. That is, in a case where the receive part 101 of the recording/viewing support apparatus shown in FIG. 1 has a function of receiving not only digital broadcasts but also analog broadcasts, it is preferable that, based on information about an electronic program guide (EPG: Electronic Program Guide) for the analog broadcasts, programs including those aired as digital broadcasts and those aired as analog broadcasts be searched for the same program to be aired at a different time. With such a structure, even if there is a possibility, for both of the preset-desired program and the same program to be aired at different a time, of degradation in image quality and sound quality caused by a poor receive state due to bad weather (that is, there is a possibility that recording or viewing becomes practically impossible), recording or viewing can be made with any analog broadcast that is found to be the same program to be aired at a different time.

INDUSTRIAL APPLICABILITY

As described in the foregoing, in a recording/viewing support apparatus for supporting recording or viewing of a program that is scheduled to be aired as a digital broadcast and in a digital broadcast television receiver having a function as such a recording/viewing support apparatus, this invention enables a program aired as a digital broadcast to be reliably recorded or viewed.

The invention claimed is:

1. A recording/viewing support apparatus for supporting recording or viewing of a program selected by a user as a desired program from among programs scheduled to be aired as digital broadcasts, said apparatus comprising:
   program specifying information obtaining means for obtaining program specifying information that specifies the desired program based on an operation by the user;
   weather forecast information obtaining means for obtaining, based on the program specifying information, weather forecast information for a relevant weather at a location where the digital broadcast will be received during a broadcast time period of the desired program as relevant weather forecast information;
   determining means for determining, based on the relevant weather forecast information, whether or not the relevant weather will be so bad as to degrade the desired program in image quality or sound quality; and
   notifying means for giving, when said determining means determines that the relevant weather will be bad, a notice of a possibility of degradation in image quality or sound quality of the desired program.

2. The recording/viewing support apparatus according to claim 1, further comprising:
   searching means for searching, when said determining means determines that the relevant weather will be bad, for a same program to be aired at a different time, which is a program that is equal in content to the desired program and is scheduled to be aired in a different time period from the broadcast time period of the desired program; and
   same program information displaying means for displaying information that specifies the same program to be aired at the different time found by said searching means.

3. The recording/viewing support apparatus according to claim 2, wherein said program specifying information obtaining means includes:
   receiving means for receiving the digital broadcast and generating a transport stream;
   program information displaying means for displaying a program list based on program sequence information included in the transport stream; and
   input operation means, operated by the user for selecting the desired program from among programs shown in the program list, for obtaining the program specifying information based on the operation by said user; and
   wherein said searching means searches for the same program to be aired at the different time by using the program sequence information.

4. The recording/viewing support apparatus according to claim 2, wherein:
   when said searching means finds the same program to be aired at the different time, said weather forecast information obtaining means obtains weather forecast information for the weather during a broadcast time period of the same program to be aired at the different time as new relevant weather forecast information;
   when the new relevant weather forecast information is obtained, said determining means determines, based on the new relevant weather forecast information, whether or not the weather during the broadcast time period of the same program to be aired at the different time will be so bad as to degrade the desired program in image quality or sound quality; and
   said notifying means gives the notice of the possibility of degradation in image quality or sound quality of the same program to be aired at the different time during the broadcast time period when the weather is determined as bad.

5. The recording/viewing support apparatus according to claim 2, wherein said searching means searches analog broadcast programs in addition to digital broadcast programs for the same program to be aired at the different time.

6. The recording/viewing support apparatus according to claim 2, wherein said weather forecast information obtaining means includes receiving means for receiving a data broadcast, and obtains the relevant weather forecast information from the received data broadcast.

7. The recording/viewing support apparatus according to claim 2, wherein said weather forecast information obtaining means includes interfacing means for accessing the Internet, and obtains, through said interfacing means, the relevant weather forecast information via the Internet.

8. The recording/viewing support apparatus according to claim 2, wherein when a probability of precipitation included in the relevant weather forecast information is larger than a predetermined value, said determining means determines that the relevant weather will be so bad as to degrade the desired program in image quality or sound quality.

9. The recording/viewing support apparatus according to claim 2, further comprising storing means for storing correlation data that relates a probability of precipitation to a receive level degradation probability defined as a probability at which a receive level of the digital broadcast becomes smaller than a predetermined level threshold value,
wherein said determining means calculates, based on the correlation data, the receive level degradation probability corresponding to the probability of precipitation included in the relevant weather forecast information and, when the calculated receive level degradation probability is larger than a predetermined probability threshold value, determines that the relevant weather will be so bad as to degrade the desired program in image quality or sound quality.

10. The recording/viewing support apparatus according to claim 1, wherein said program specifying information obtaining means includes:
receiving means for receiving the digital broadcast and generating a transport stream;
program information displaying means for displaying a program list based on program sequence information included in the transport stream; and
input operation means, operated by the user for selecting the desired program from among programs shown in the program list, for obtaining the program specifying information based on the operation by said user.

11. The recording/viewing support apparatus according to claim 1, wherein said weather forecast information obtaining means includes receiving means for receiving a data broadcast, and obtains the relevant weather forecast information from the received data broadcast.

12. The recording/viewing support apparatus according to claim 1, wherein said weather forecast information obtaining means includes interfacing means for accessing the Internet, and obtains, through said interfacing means, the relevant weather forecast information via the Internet.

13. The recording/viewing support apparatus according to claim 1, wherein when a probability of precipitation included in the relevant weather forecast information is larger than a predetermined value, said determining means determines that the relevant weather will be so bad as to degrade the desired program in image quality or sound quality.

14. The recording/viewing support apparatus according to claim 1, further comprising storing means for storing correlation data that relates a probability of precipitation to a receive level degradation probability defined as a probability at which a receive level of the digital broadcast becomes smaller than a predetermined level threshold value,
wherein said determining means calculates, based on the correlation data, the receive level degradation probability corresponding to the probability of precipitation included in the relevant weather forecast information and, when the calculated receive level degradation probability is larger than a predetermined probability threshold value, determines that the relevant weather will be so bad as to degrade said desired program in image quality or sound quality.

15. A recording/viewing support apparatus for supporting recording or viewing of a program selected by a user as a desired program from among programs scheduled to be aired as digital broadcasts, said apparatus comprising:
program specifying information obtaining means for obtaining program specifying information that specifies the desired program based on an operation by said user;
weather forecast information obtaining means for obtaining, based on the program specifying information, weather forecast information for a relevant weather at a location where the digital broadcast will be received during a broadcast time period of the desired program as relevant weather forecast information;
storing means for storing correlation data that relates the weather forecast information to a receive level degradation probability defined as a probability at which a receive level of the digital broadcast is smaller than a predetermined level threshold value; and
notifying means for obtaining the receive level degradation probability corresponding to the relevant weather forecast information, and notifying the user of the obtained receive level degradation probability as information which is indicative of a possibility of degradation in image quality or sound quality of the desired program.

* * * * *